(Model.)
C. B. MINTLE.
BRIDLE RING.
No. 254,358.　　　　　　　　　　Patented Feb. 28, 1882.
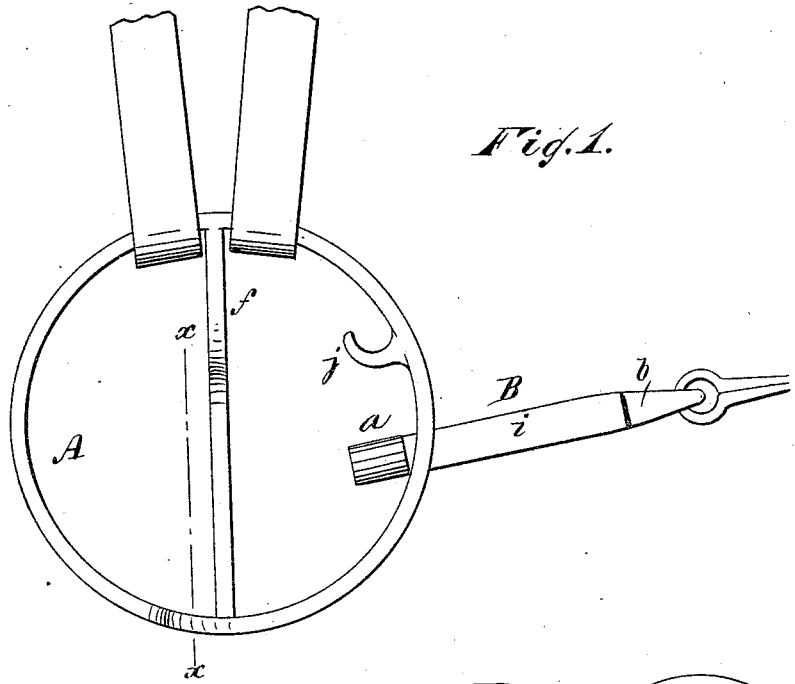
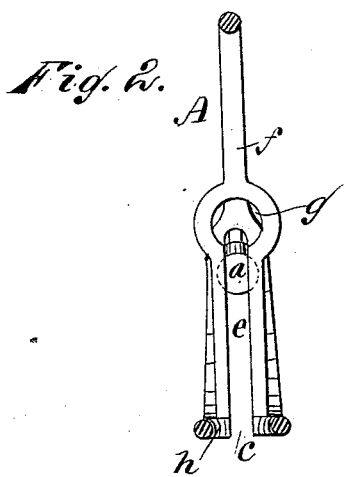
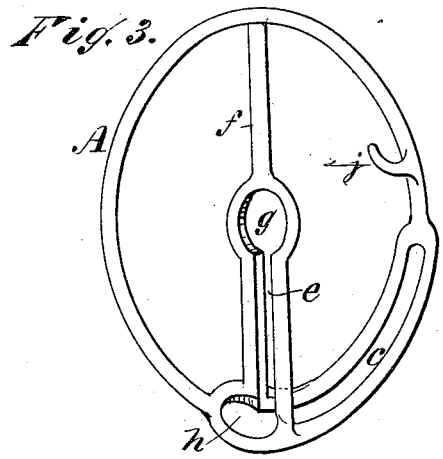
WITNESSES:
Theo. G. Hoster
C. Sedgwick
INVENTOR:
C. B. Mintle
BY Munn & Co
ATTORNEYS.

UNITED STATES PATENT OFFICE.

CHARLES B. MINTLE, OF GLENWOOD, IOWA.

BRIDLE-RING.

SPECIFICATION forming part of Letters Patent No. 254,358, dated February 28, 1882.

Application filed December 3, 1881. (Model.)

*To all whom it may concern:*

Be it known that I, CHARLES B. MINTLE, of Glenwood, in the county of Mills and State of Iowa, have invented a new and useful Improvement in Bridle-Rings, of which the following is a full, clear, and exact description.

The object of my invention is to provide a new and improved safety-ring to be used with a headed hook, the same being particularly adapted to be used on headstalls, on bridles, and in other places.

Reference is to be had to the accompanying drawings, forming part of this specification, in which similar letters of reference indicate corresponding parts in all the figures.

Figure 1 is a plan view of my improved ring, showing the headed hook in place in the ring. Fig. 2 is a sectional elevation taken on the line $xx$ of Fig. 1. Fig. 3 is a perspective view of the ring, and Fig. 4 is a side elevation of the hook.

A represents the ring, and B represents the hook, which latter is formed with the head $a$ and with the loop $b$, by means of which the hook is attached to the strap. The rim of the ring is made double, or formed with the slot or passage $c$, which extends about one-quarter of the circumference of the rim, and the rim is formed with the diametrical portion $f$, which is also double, or formed with the slot or passage $e$, which extends to the center of the said diametrical portion, where it is enlarged, as shown at $g$, and this slot or passage $e$ communicates with or intersects the slot or passage $c$ in the rim, as shown in Fig. 3. The passage $c$ is enlarged, as shown at $h$, just in front of or beyond the point where the slot $e$ intersects the slot $c$.

The enlargements $g$ and $h$ are of such size as to permit the passage of the head $a$ of the hook B, and the slots or passages are of such size as to permit the free passage of that portion of the hook immediately below or next to the head, but will retain the head of the hook, as shown in Fig. 1. The length of the flat or narrow portion $i$ of the hook, which comes between the head $a$ and the loop $b$, must be equal to or preferably a little greater than the radius of the ring, and the head $a$ of the hook should be made of a length greater than the diameters of the enlargements $g$ and $h$.

When thus constructed, to attach the hook it is necessary to first pass the head vertically or endwise through the enlargement $h$, and then to swing the loop end of the hook up or along the passage or slot $c$ to its terminus, which will bring the head of the hook in position to be drawn backward in a line at or near right angles with the slot or passage $e$ through the enlargement $g$. After passing through the enlargement $g$ the head of the hook will be held in the ring, as shown in Fig. 1. To disengage the hook from the ring the procedure will be just the reverse of that just described, as will be readily understood.

The rim of the ring is provided upon the inside with the horn $j$, which prevents the straps of the headstall or other straps of the harness or thing with which my improved ring may be used from dropping down upon the ring and coming in contact with the head of the hook.

By this construction of the ring and hook it will be seen that the attachment and detachment of the hook with and from the ring are very easily and quickly done, and that there is no danger of the hook becoming accidentally detached; and it will be seen that the hook and ring are very durable and cheap of construction.

Having thus fully described my invention, I claim as new and desire to secure by Letters Patent—

1. The ring A, formed with the passages $c$ and $e$ and with the enlargements $g$ and $h$, in combination with the headed hook B, substantially as described.

2. The ring having the diametrical portion $f$ formed with the slot or passage $e$ and enlargement $g$, and the rim formed with the slot or passage $c$ and enlargement $h$, and having the horn $j$, in combination with the headed hook B, substantially as described.

CHARLES B. MINTLE.

Witnesses:
ANDREW MINTLE,
A. C. SABIN.